(12) United States Patent
Alva

(10) Patent No.: US 11,448,112 B2
(45) Date of Patent: Sep. 20, 2022

(54) METHOD, PROCESSING UNIT, AND COMPUTER PROGRAM FOR ASCERTAINING A FILL LEVEL OF SOOT PARTICLES IN A SOOT PARTICULATE FILTER

(71) Applicant: Robert Bosch GmbH, Stuttgart (DE)

(72) Inventor: Erick Falcon Alva, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/522,979

(22) Filed: Nov. 10, 2021

(65) Prior Publication Data
US 2022/0154623 A1 May 19, 2022

(30) Foreign Application Priority Data

Nov. 13, 2020 (DE) .......................... 102020214285.8

(51) Int. Cl.
*F01N 9/00* (2006.01)
(52) U.S. Cl.
CPC .......... *F01N 9/002* (2013.01); *F01N 2560/08* (2013.01); *F01N 2900/0416* (2013.01); *F01N 2900/08* (2013.01); *F01N 2900/1406* (2013.01); *F01N 2900/1606* (2013.01)
(58) Field of Classification Search
CPC ................. F01N 9/002; F01N 2560/08; F01N 2900/0416; F01N 2900/08; F01N 2900/1406; F01N 2900/1606
See application file for complete search history.

(56) References Cited

U.S. PATENT DOCUMENTS

| 2007/0157609 A1 | 7/2007 | Venghaus et al. |
| 2007/0251221 A1 | 11/2007 | Lueschow et al. |
| 2008/0236262 A1* | 10/2008 | Andrews ................ G01M 15/11 701/111 |
| 2011/0314914 A1* | 12/2011 | Gregg ...................... H03B 5/30 73/570.5 |
| 2012/0167665 A1* | 7/2012 | Garimella .............. F02M 26/49 73/23.31 |
| 2019/0331038 A1* | 10/2019 | Brahma .............. F02D 41/1456 |

FOREIGN PATENT DOCUMENTS

| CN | 103939192 A | * | 7/2014 |
| DE | 10347506 A1 | | 5/2005 |
| DE | 102017200539 A1 | | 7/2018 |
| WO | 9923369 A1 | | 5/1999 |

* cited by examiner

*Primary Examiner* — Matthew T Largi
(74) *Attorney, Agent, or Firm* — Michael Best & Friedrich LLP

(57) ABSTRACT

A method (500) for ascertaining a fill level of soot particles in a soot particulate filter (1), comprising acquiring (510) a time course of a pressure of an exhaust gas (4) upstream (16) of the soot particulate filter (1) and/or a differential pressure over the soot particulate filter (1) as a pressure signal, transforming (520) the pressure signal into a pressure frequency spectrum, ascertaining (530) a spectral power density in the pressure frequency spectrum, and ascertaining (540) the fill level of the soot particles in the soot particulate filter (1) in dependence on the spectral power density.

6 Claims, 5 Drawing Sheets

METHOD, PROCESSING UNIT, AND COMPUTER PROGRAM FOR ASCERTAINING A FILL LEVEL OF SOOT PARTICLES IN A SOOT PARTICULATE FILTER

BACKGROUND OF THE INVENTION

The present invention relates to a method for ascertaining a fill level of soot particles in a soot particulate filter and a processing unit and a computer program for carrying out the method.

Particulate filters are used not only in diesel engines, but increasingly also in gasoline engines to keep the emission values of the engines within the prescribed exhaust gas norms. Such filters are referred to as gasoline particulate filters (GPF). A particulate filter can collect and store the soot from the internal combustion engine. For this purpose, for example, so-called wall flow filters can be used, in which the exhaust gas flows through partially permeable or porous wall materials such as ceramics or sintered metals and the particles accumulate on the wall material.

The filter is thus so loaded with particles—in particular soot—after some time that the permeability decreases and the flow resistance increases accordingly. Depending on the filter design, a regeneration of the filter can then take place, which means that the combustible accumulated particles are deliberately burned off to obtain a functional filter again. Depending on the filter type, this burnoff can take place passively in the continuous operation if, for example, the exhaust gas temperatures are continuously sufficiently high, or can take place at least partially actively, that is to say the operating conditions in the filter are temporarily changed by deliberately increasing the exhaust gas temperature, by burner use, by adding additives, and/or in another way so that the required temperatures for burning off the soot particles (typically from approximately 600° C.) are reached. For example, an engine control unit can then adapt the corresponding engine parameters such as the ignition time to increase the exhaust gas temperature, and in addition can modify the composition of the fuel mixture to reach an oxygen excess in the exhaust gas. This oxygen excess combined with the elevated temperatures will result in the soot in the filter being oxidized to form carbon dioxide. After complete regeneration, the engine parameters are adapted to the normal operation again.

To regenerate a particulate filter in a timely manner and to the desired extent and also to ensure the function overall, the exhaust gas pressure is monitored in operation, in particular the differential pressure before and after the filter element. The filter loading can then be determined from the measured continuous pressure increase.

To check or calibrate such a system, the filter can be manually weighed to establish the actual loading with particles. It can be found in this case that the filter charges obtained from the pressure measurements are subject to a significant error; sometimes the quantities of soot actually present in the filter deviate by a factor of 3 or even more from one another at equal measured pressure, so that a reliable determination of the filter loading to comply with limiting values is possible with difficulty. An incorrect measurement of the loading additionally has the risk of late or inadequate regeneration of the filter, which due to the increased exhaust gas counterpressure, for example, can result in severe problems for the operation of the internal combustion engine, in particular elevated fuel consumption.

SUMMARY OF THE INVENTION

According to the invention, a method for ascertaining a fill level of soot particles in a soot particulate filter downstream of an internal combustion engine and a processing unit and a computer program for carrying out the method.

The invention makes use of the spectral power density of a pressure signal, which originates from a time course of a pressure of an exhaust gas of the internal combustion engine upstream of the soot particulate filter and/or a differential pressure over the soot particulate filter, to ascertain the fill level of the soot particles in the soot particulate filter.

This is based on the finding that the inaccuracy of the pressure-based loading measurement has its origin in the hysteresis behavior of the filter, which results due to uneven soot burnoff in the filter. Due to temperature differences and different flow behavior within the filter, some filter regions regenerate faster than others. The regions regenerating or burning out faster generate "holes" in the soot layer, which cause a sudden pressure drop. However, experiments can show that even a small quantity of soot rapidly results in filling of the holes and thus the observed relationship between pressure and soot loading again corresponds to the behavior of a homogeneously loaded filter already after a short time. The changes in the pressure frequency signals used according to the invention to judge the filter loading, however, are based on a frequency-dependent damping of pressure surges through the soot particles accumulated in the filter and are therefore substantially independent of the spatial distribution of the soot particles in the filter. The hysteresis problem can thus be avoided by the present invention.

The transformation of the pressure signal in the pressure frequency spectrum is carried out in particular using a fast Fourier transform (FFT). Results can thus be obtained essentially in real time and the computing effort for the corresponding operations is restricted to a manageable amount.

The pressure frequency spectrum has a range of low frequency, which is below a maximal frequency dependent on a crankshaft frequency, and the fill level is preferably ascertained to be higher the higher an integrated power density of the pressure frequency signal is in the range of low frequency. In other words, the power of the pressure signal is ascertained up to the maximal frequency. The range of low frequency can be delimited at the bottom by a minimal frequency, for example, at a range above 20 Hz or another frequency amount which can be selected, in particular in dependence on the design of the internal combustion engine and, for example, acoustic properties of the exhaust system. For example, the lowest value having disappearing amplitude can be selected as the minimal frequency. This frequency range below the crankshaft frequency is influenced particularly strongly by the fill level of the soot particles in the filter and therefore permits a particularly informative assessment of the fill level.

The maximal frequency preferably corresponds to the crankshaft frequency of the internal combustion engine, since it has been shown that this frequency represents a natural limit for the loading-dependent influencing of the pressure frequency signal.

The integrated power density of the pressure frequency signal is scaled in particular to an integrated power density of a reference pressure frequency signal with empty soot particulate filter. The fill level is determined in this way in particular in dependence on the difference or the ratio between the signal of the empty filter and the current signal, which significantly facilitates an estimation of the current fill level or increases its precision.

The method can advantageously furthermore comprise carrying out a measure if the fill level exceeds a predefined threshold value. The measure comprises in particular carrying out an active filter regeneration, wherein other measures are also conceivable and can achieve advantageous effects. The following measures are mentioned here solely by way of example: implementing a propulsion prohibition, in particular in the case of high fill levels and high temperature in the exhaust system at the same time, and/or a propulsion release, in particular at a temperature which is suitable for filter regeneration and moderate fill level in the particulate filter at the same time, wherein, for example, electric machines can also be used to generate the required propulsion, adapting shifting times, in particular in automatic transmissions, prohibiting automatic operating pauses of the internal combustion engine in systems having automatic start-stop mechanism, and similar measures. The ascertained fill level can thus be incorporated in a useful manner in the control of the internal combustion engine.

The measure, in particular the filter regeneration, can advantageously be ended when the ascertained fill level reaches a minimal value. For example, the minimal value can be selected here so that it indicates an empty filter. In certain cases, however, a minimal value can also be advantageous which indicates a filter loaded with a residual component of soot particles, since a partially-loaded filter can have, for example, a higher filtration effect, in particular with respect to certain particle sizes.

A processing unit according to the invention, for example, a control unit of a motor vehicle, is configured, in particular by programming, to carry out a method according to the invention.

The implementation of a method according to the invention in the form of a computer program or computer program product having program code for carrying out all method steps is also advantageous, since this causes particularly low costs, in particular if an executing control unit is also used for other tasks and is therefore provided in any case. Suitable data carriers for providing the computer program are in particular magnetic, optical, and electrical memories, e.g., hard drives, flash memories, EEPROMs, DVDs, etc. A download of a program via computer networks (Internet, intranet, etc.) is also possible.

Further advantages and embodiments of the invention result from the description and the appended drawing.

BRIEF DESCRIPTION OF THE DRAWINGS

The invention is schematically illustrated on the basis of an exemplary embodiment in the drawing and is described hereinafter with reference to the drawing.

DETAILED DESCRIPTION

Figure 1:
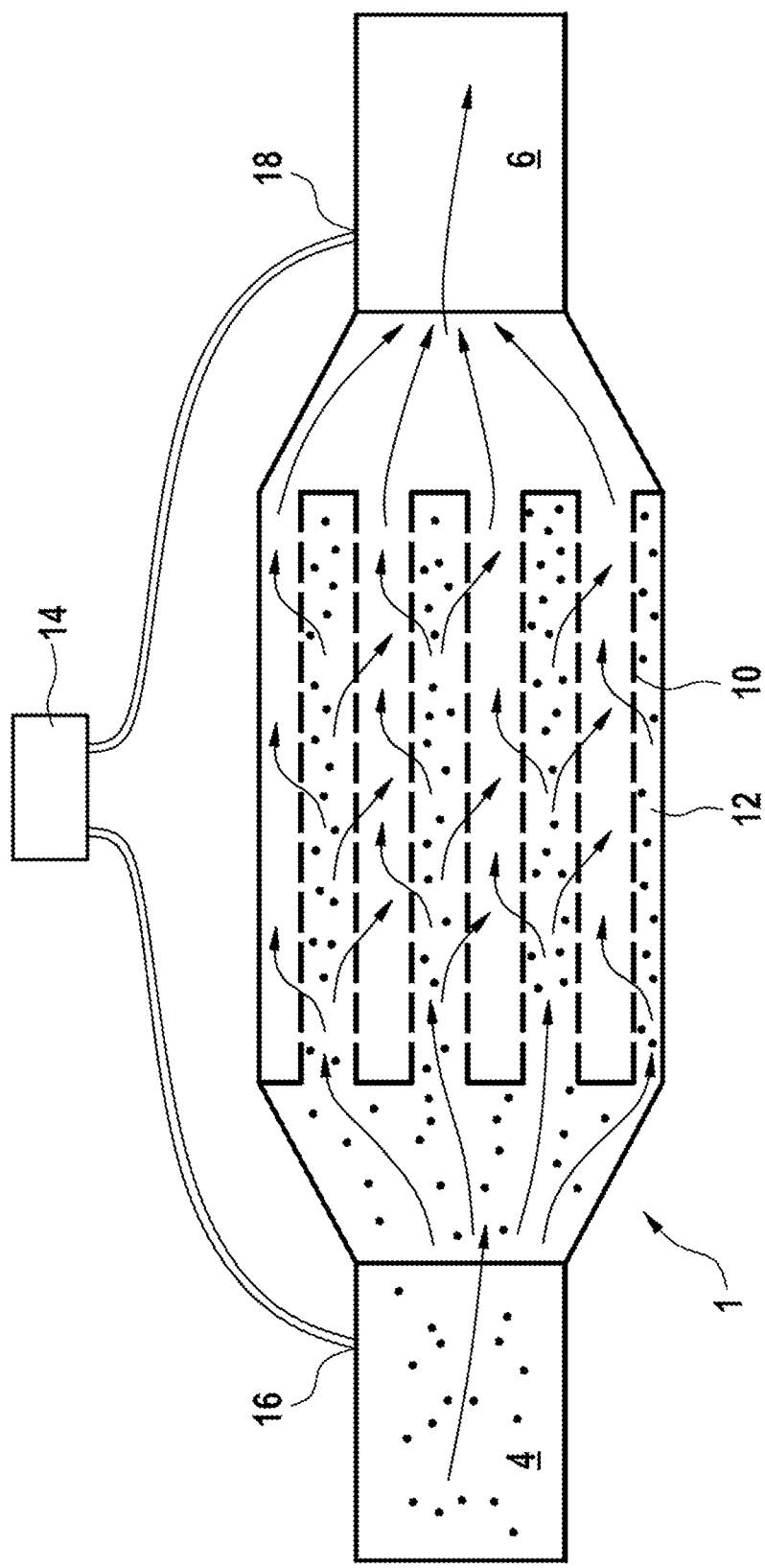
FIG. 1 shows an exemplary particulate filter system for use with embodiments of the invention.

An exemplary particulate filter element 1 is shown schematically in longitudinal section in FIG. 1, in which embodiments of the invention can be used. Exhaust gas 4 originating from an internal combustion engine having contained particles of different sizes and masses is introduced into the filter. The exhaust gas flow through the filter is indicated by arrows. Wall elements 10 made of a porous or partially-permeable material are introduced in the interior of the filter, which form, for example, a honeycomb-shaped structure having channels 12 alternately closed at the ends thereof, so that the inflowing exhaust gas 4 has to pass through the channel walls 10 and the contained particles are deposited on and in the walls 10. The exhaust gas thus filtered is then passed on in the exhaust system 6.

Depending on the embodiment, a particulate filter element 1 can also be formed combined with a catalytic converter, or one or more catalytic converter elements can be provided at other points in the exhaust system.

For pressure measurement, a pressure sensor is provided before 4 and/or after 6 the particulate filter, which measures the pressure or the flow rate in the exhaust gas at the respective point. In FIG. 1, a pressure sensor 14 is shown for measuring a differential pressure before 16 and after 18 the particulate filter element 1. Mentioning pressure in the present invention is to refer to all suitable pressure measurements, thus optionally to the measurement of a differential pressure before and after the filter, to an absolute pressure before or after the filter, to a through-flow resistance, or to a combination of such measurements. The same value is to be observed within a method in each case for the use of exemplary embodiments in order to enable the described evaluation.

Figure 2:
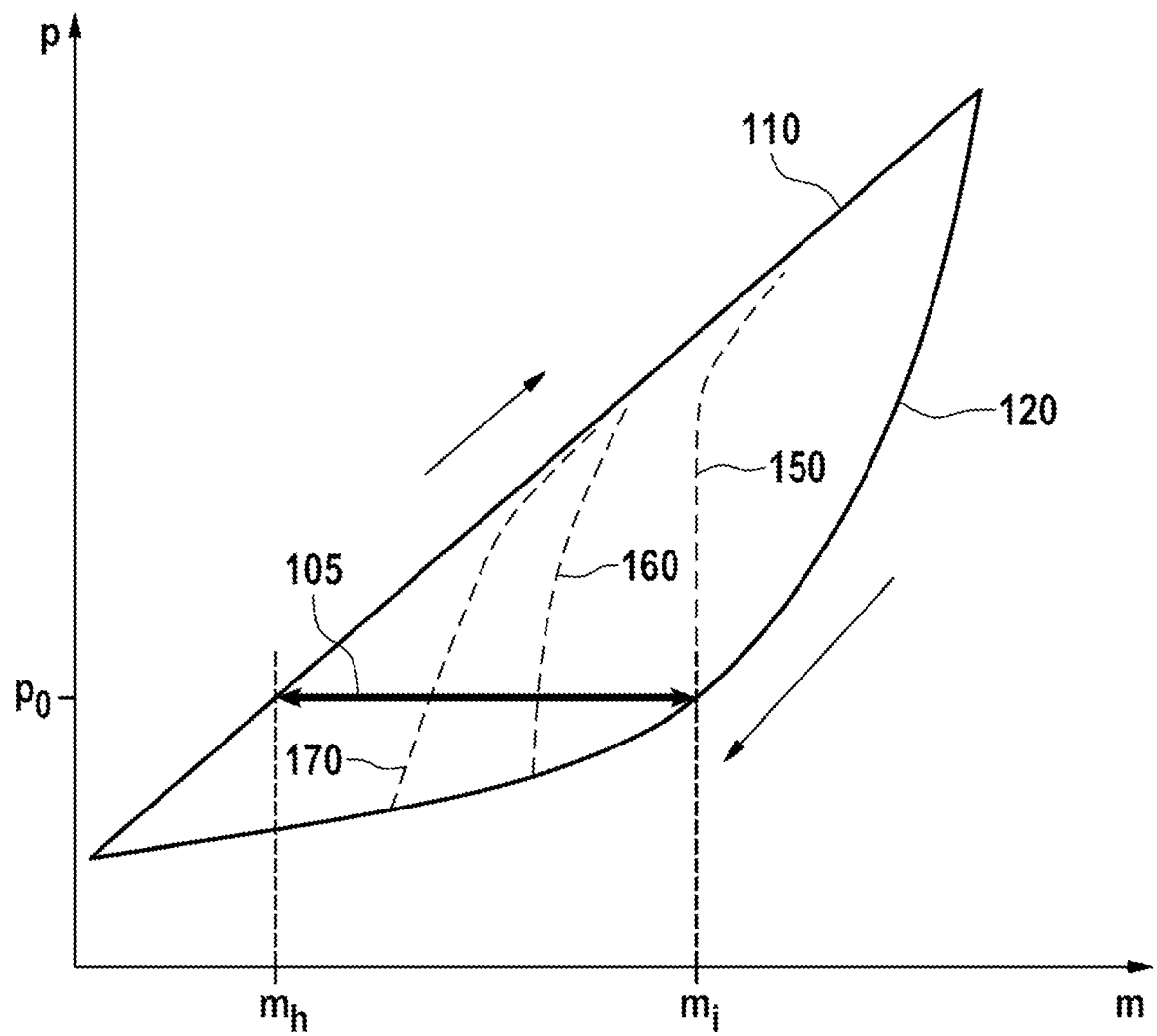
FIG. 2 shows a diagram which represents the measured pressure relative to the filter loading in a typical particulate filter according to one embodiment of the invention.

As already described above, the loading state of the filter element 1 can only be concluded to a limited extent from the pressure values thus measured, since the values deviate strongly from one another. This deviation occurs because the burning off of the soot layer in the filter does not necessarily take place uniformly, but rather in particular in the case of strong regeneration local "holes" are burned or the soot from the deep pores is burned off first. The measured pressure thus decreases quickly very strongly during a regeneration. If the remaining soot layer is then burned off further relatively uniformly, the pressure loss again becomes slower. The corresponding pressure behavior in an exemplary soot particulate filter is shown in FIG. 2. The soot loading m (in grams) is indicated on the horizontal axis, while the vertical axis represents the pressure p.

During the loading of the (essentially) empty filter 1, initially an increasing pressure is measured which rises uniformly, as indicated by the linear curve 110. At the maximum point of the curve, the filter regeneration has been initiated, so that now the accumulated soot particles burn off. Due to the described uneven burnoff, the pressure initially drops significantly more strongly than it has increased in the same loading range during the loading, as can be seen from the curved curve 120, which represents the pressure behavior during the regeneration. The pressure drop only becomes flatter, thus slower, after some time, when the remaining wall layers are burned off.

If the pressure is measured during such a regeneration phase 120 or after incomplete or aborted regeneration of the filter, it can thus be that the obtained pressure value $p_0$ is low and a low loading state $m_h$ of the filter is incorrectly concluded if the linear loading curve 110 were used for the determination. The actual loading state $m_t$ of the filter can be multiple times higher if the instantaneous pressure behavior follows the nonlinear regeneration curve 120. The horizontal arrow between the two pressure curves 110 and 120 shows the possible error range 105 at equal measured pressure value as long as it is not known which state the filter is in.

It is obvious that the real curve shape can deviate therefrom and can be dependent on further conditions, and that the indicated values are also to be understood solely as examples.

However, it could also be established that the pressure behavior upon renewed loading of the filter merges quickly back into the linear behavior of the loading curve 110, even if only small quantities of soot have been absorbed, as indicated by the lines 150, 160, and 170. This may be explained in that small quantities of soot rapidly fill up the cavities arising during the burnoff again and subsequently the wall layer is built up uniformly again, which corresponds to the linear loading curve 110 of a homogeneously loaded filter.

According to one embodiment of the invention, this problem is avoided to determine the filter loading from the measured pressure signal with improved accuracy.

For this purpose, the property of the loaded filter 1 of damping pressure surge frequencies in dependence on the degree of loading of the filter 1 or on the fill level of the soot particles in the filter 1 is utilized.

Figure 3:
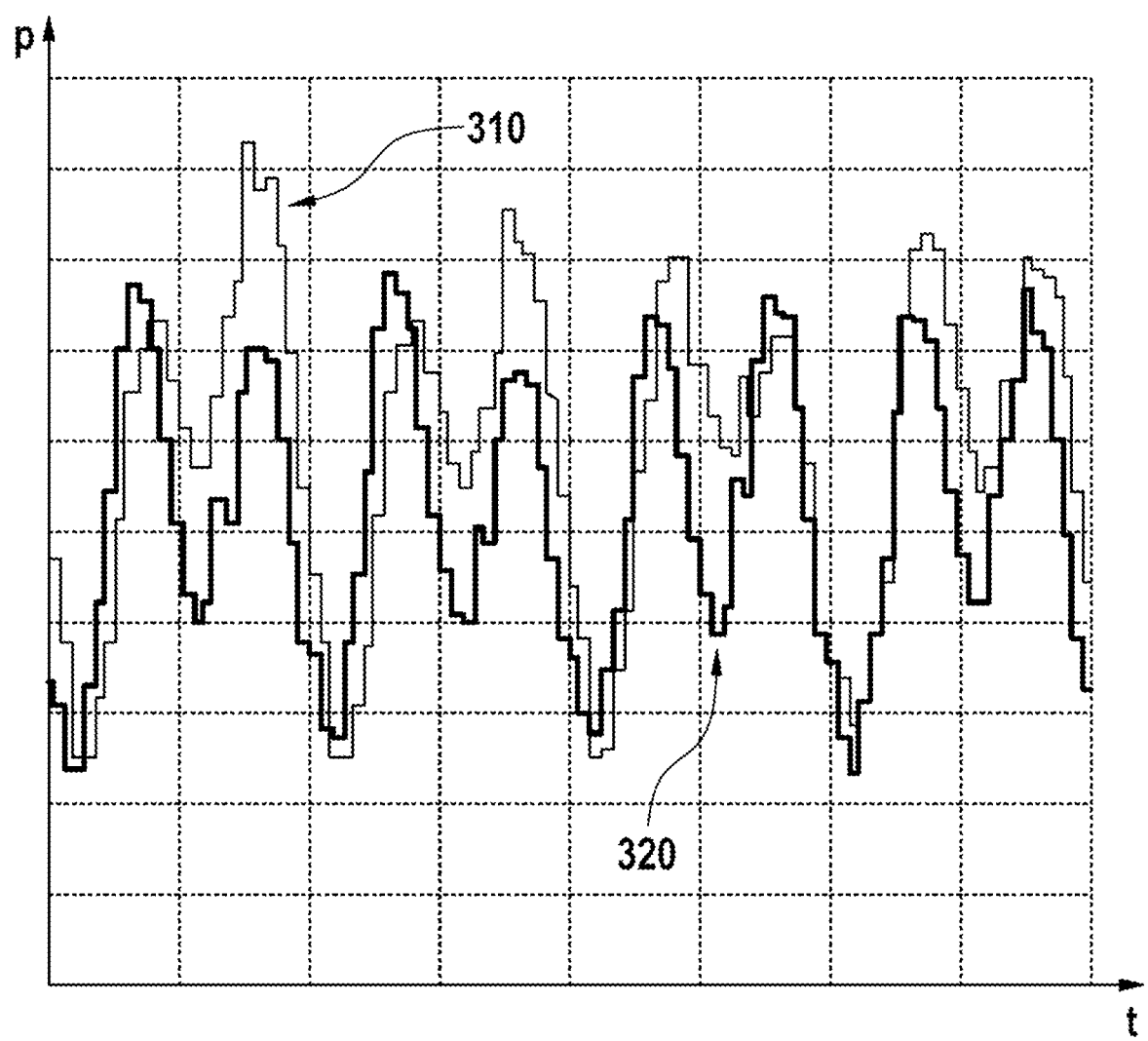
FIG. 3 shows a diagram which represents pressure courses over time acquired in the scope of the invention by way of example in a typical particulate filter having different particle fill levels.

In FIG. 3, two pressure courses 310 and 320 over time are shown by way of example, as can be observed during operation of the internal combustion engine in the exhaust system. The time t is plotted on the ordinate here and the pressure p is plotted on the abscissa. The curve 320 represents a pressure course as is typically obtained with an empty particulate filter 1, while the curve 310 shows a typical pressure course with loaded filter 1. It can be seen here that maxima of the curve 320 extend more symmetrically around a respective vertex than is the case with loaded filter (curve 310). The differences in the curve shapes may be recognized better and also evaluated more easily after a Fourier transform has been carried out, the result of which is shown by way of example in FIG. 4.

Figure 4:
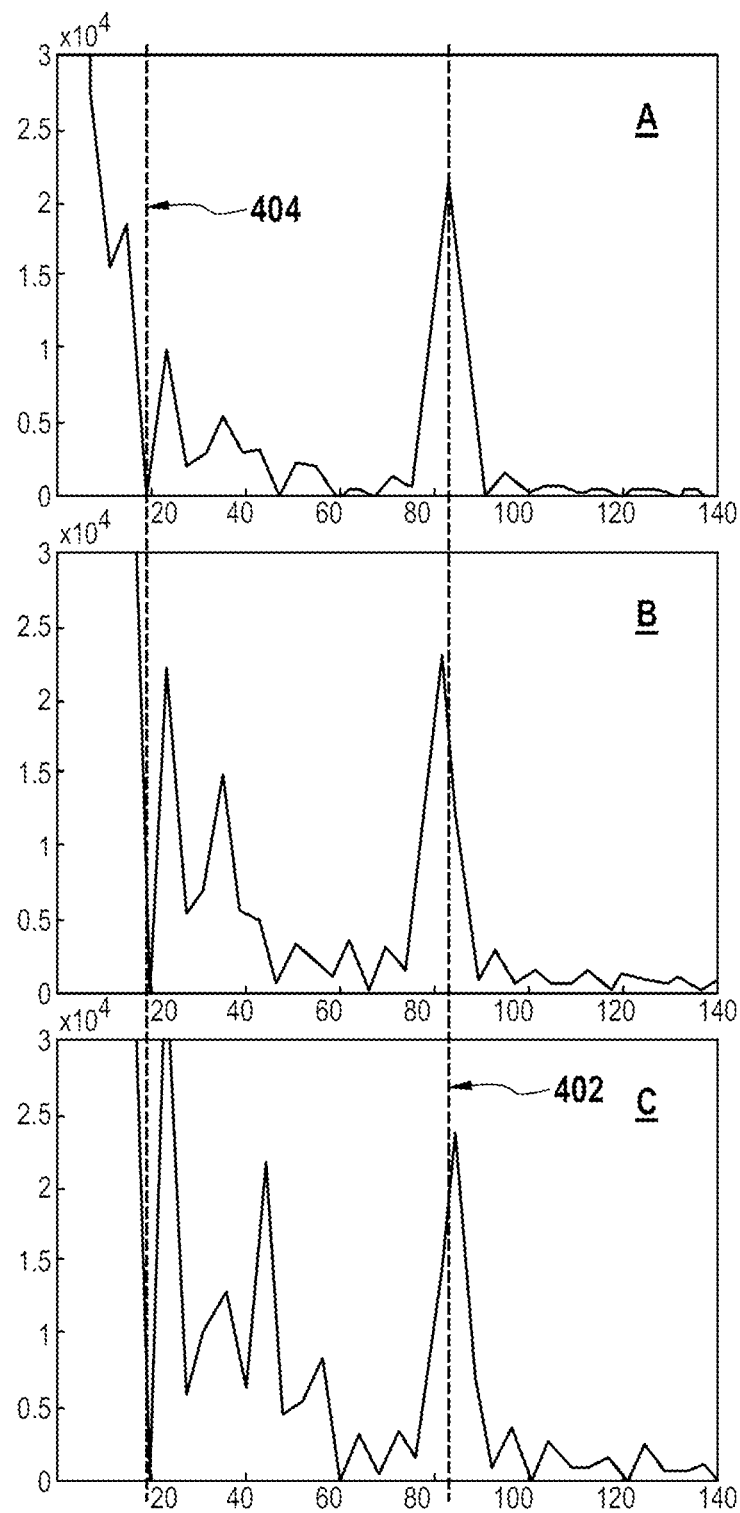
FIG. 4 shows diagrams which represent pressure frequency spectra ascertained by way of example for three different filter charges in a typical particulate filter according to one embodiment of the invention.

FIG. 4 shows by way of example, for three different fill levels, the respective associated pressure frequency spectrum which maps the spectral power density, wherein the behavior of an empty filter 1 is shown in diagram A, the behavior of a filter 1 which is loaded, for example, with 5 g of soot particles is shown in diagram B, and the behavior of a filter 1 which is loaded, for example, with 10 g of soot particles is shown in diagram C. A local maximum of the power density can be seen at a frequency 402 which can be associated with the rotational frequency of the crankshaft (crankshaft frequency) of the internal combustion engine, in which the exhaust gas 4 conducted through the particulate filter 1 is produced. This maximum results in that a defined number of pressure surges (for example, in a four-stroke gasoline engine having four cylinders, 2 pressure surges in the respective exhaust strokes) is generated with each crankshaft revolution. This frequency 402 accordingly occurs prominently in the power spectrum. Furthermore, it can be seen that with increasing fill level of the particles in the filter 1, the power density increases in a range of low pressure frequencies, in particular below the crankshaft frequency 402. This increase is to be attributed, as mentioned, to a damping behavior of the particulate filter 1 changing in dependence on the fill level. Moreover, this increase of the power density in the range of low frequencies is substantially independent of the local distribution of the particles inside the filter 1, so that the integrated power density of the pressure frequency spectrum permits a reliable statement about the particulate fill level in the filter 1.

Figure 5:
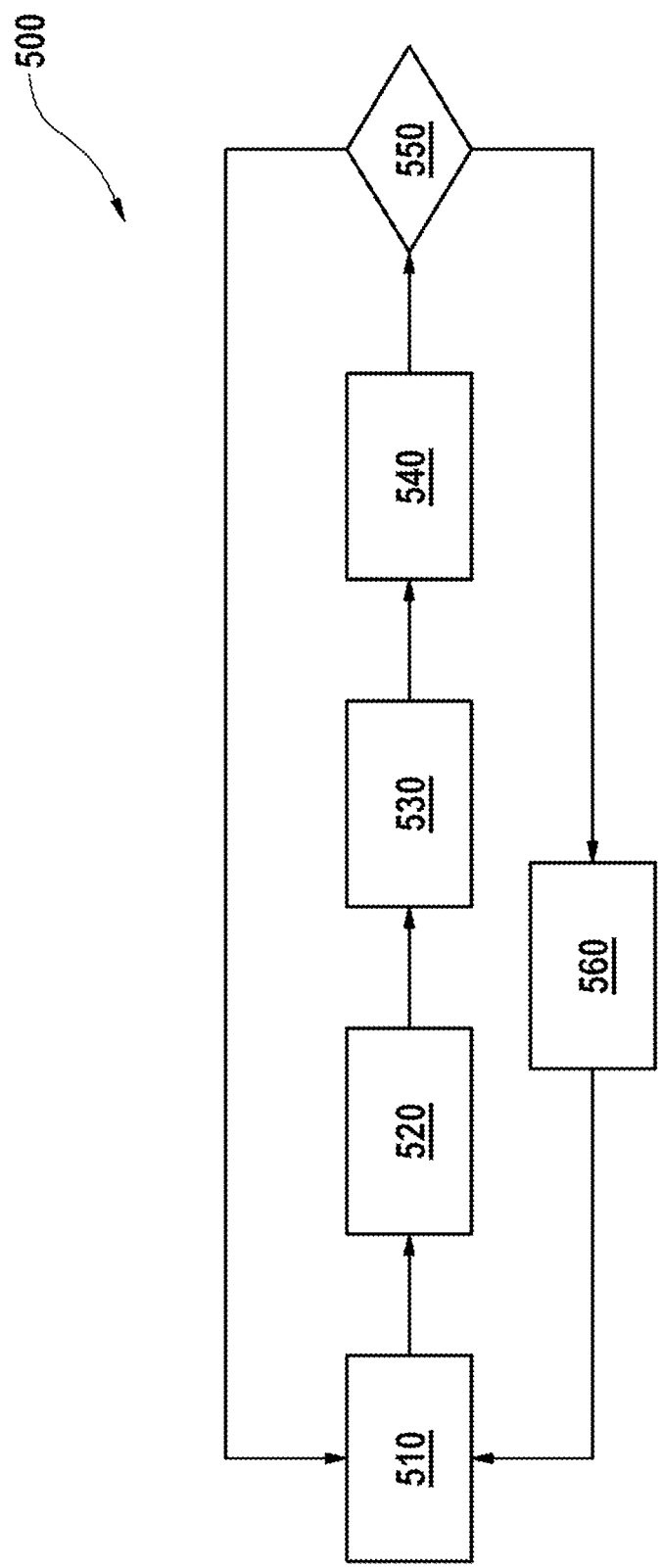
FIG. 5 shows exemplary method steps of embodiments of the invention.

A method which enables such an evaluation according to one embodiment of the invention is shown in FIG. 5 in the form of a simplified flow chart and is identified as a whole with 500.

Firstly, the pressure curve in or over the particulate filter 1 is acquired for this purpose in a measuring step 510. For this purpose, for example, absolute pressure sensors, piezoelectric sensors, or differential pressure sensors 14 can be used upstream 16 or upstream 16 and downstream 18 of the particulate filter 1. Such a sensor generally supplies a signal which reflects the current pressure. This signal can be received by a processing unit executing the method. A pressure course over time is ascertained from multiple chronologically successive signals, for example, using a memory of the processing unit.

In a subsequent step 520, a pressure frequency spectrum is calculated from the pressure course as was acquired in step 510. A fast Fourier transform (FFT) can be used for this purpose in particular.

From this pressure frequency spectrum, in a step 530, an integrated spectral power density for a frequency range below the frequency associated with the rotational frequency of the crankshaft (frequency 402 in FIG. 4) is calculated. In particular, the frequency distribution can be taken into consideration here in a range below the frequency 402 and above a minimal frequency (for example, approximately 20 Hz, frequency 404 in FIG. 3). The minimal frequency can in particular be selected on the basis of the existing spectrum so that a possibly present range of high deflection at low frequencies is not incorporated in the evaluation. For example, the lowest value having disappearing amplitude (essentially zero here) or the first minimum can be selected as the minimal frequency.

In a step 540, the fill level of the soot particles in the particulate filter 1 is calculated from the integrated power density thus ascertained. For this purpose, for example, the ascertained integrated power density can be scaled to an integrated power density of an empty particulate filter (reference) stored in a memory (thus divided by the reference). An ascertainment of a deviation between the ascertained integrated power density and the reference represents another option for the calculation. In any case, the current fill level can be calculated using the integrated power density related to the reference and a stored processing operation (for example a characteristic curve or a conversion factor, or the like). For this purpose, the stored processing rule is accordingly applied to the scaled power density or the deviation between ascertained power density and reference, whereby the current fill level of the soot particles in the filter 1 results.

In an evaluation step 550, the fill level thus ascertained is compared to a threshold value. If it is established during the evaluation in step 550 that the threshold value is exceeded, the method 500 continues with an action step 560 in which a measure is carried out. The measure comprises in particular method steps which reduce the loading of the filter, thus, for example, measures of the engine controller which cause the internal combustion engine to produce an exhaust gas 4 having higher temperature. For this purpose, for example, ignition angle and/or injection quantity and/or combustion air quantity can be adapted. A further option for reducing the particle loading of the filter is a use of an external exhaust gas burner, to which a combustible air-fuel mixture can be supplied to carry out the measure and in which burner said mixture can be combusted. Due to the measure, the soot collected in the filter 1 is caused to react with oxygen contained in the exhaust gas 4, so that the soot, which essentially consists of carbon, is converted into carbon dioxide and is discharged with the exhaust gas into the downstream exhaust system 6. The filter is thus freed of soot particles, which is generally referred to as regeneration. During action step 560, the remaining method 500 can be used to monitor the regeneration, so that step 560 can be ended when the fill level indicates a predefined minimal value, which indicates an empty filter (for example fill level=0), for example. However, fill levels different from zero can also be used as the minimal value, which can have a positive effect on the filtration effectiveness, in particular with respect to certain particle sizes. After completion of step 560, the method 500 can return to step 510.

In contrast, if it is established during the evaluation in step 550 that the threshold value is not exceeded, the method 500 can return directly to step 510.

This evaluation (Fourier transform, integration, scaling, comparison to threshold values, etc.) can be performed by a processing unit, for example, by an already provided control unit such as an engine control unit, or also by a separate control unit which monitors the filter function and optionally further functions in the area of the exhaust gas posttreatment. This processing unit is connected to the pressure sensor or sensors 14 and can thus receive and evaluate the measured values from the exhaust gas 4, 6.

The method 500 according to the invention was explained here on the basis of an exemplary embodiment, wherein it is to be explicitly emphasized that the invention is not restricted to this special embodiment. Rather, method steps described here can also be executed in another sequence, for example in reverse sequence, or can take place in parallel to one another. The integration of multiple steps into a single step can also possibly be advantageous. Furthermore, it is to be noted that the invention is not restricted to an application in conjunction with an internal combustion engine. Applications in conjunction with other exhaust systems are also conceivable and advantageous, for example. For example, burner exhaust gases can also be conducted through a soot particulate filter, which can be monitored accordingly, so that the method 500 can also be applicable with respect to heating or powerplant systems.

The invention claimed is:

1. A method (500) for ascertaining a fill level of soot particles in a soot particulate filter (1), the method comprising:
   acquiring (510), via a pressure sensor, a time course of a pressure of an exhaust gas (4) upstream (16) of the soot particulate filter (1) and/or a differential pressure over the soot particulate filter (1) as a pressure signal,
   transforming (520), via a processing unit, the pressure signal into a pressure frequency spectrum,
   ascertaining (530) a spectral power density in the pressure frequency spectrum,
   ascertaining (540) the fill level of the soot particles in the soot particulate filter (1) as a function of the spectral power density, wherein the pressure frequency spectrum has a range of low frequency, which is below a maximal frequency (302) dependent on a crankshaft frequency of an internal combustion engine producing the exhaust gas (4), and the fill level is ascertained to be higher the higher an integrated power density of the pressure frequency spectrum is in the range of low frequency, and
   carrying out an active filter regeneration when the fill level exceeds a predefined threshold value.

2. The method (500) according to claim 1, wherein the maximal frequency (302) corresponds to the crankshaft frequency of the internal combustion engine.

3. The method (500) according to claim 1, wherein the integrated power density of the pressure frequency spectrum is scaled to an integrated power density of a reference pressure frequency signal of an empty soot particulate filter (1) or is subtracted from the integrated power density of the reference pressure frequency signal.

4. The method (500) according to claim 1, wherein the active filter regeneration is ended when the ascertained fill level reaches a minimal value.

5. A processing unit configured to ascertain a fill level of soot particles in a soot particulate filter (1), by:
   acquiring (510), via a pressure sensor, a time course of a pressure of an exhaust gas (4) upstream (16) of the soot particulate filter (1) and/or a differential pressure over the soot particulate filter (1) as a pressure signal,
   transforming (520) the pressure signal into a pressure frequency spectrum,
   ascertaining (530) a spectral power density in the pressure frequency spectrum, and
   ascertaining (540) the fill level of the soot particles in the soot particulate filter (1) as a function of the spectral power density, wherein the pressure frequency spectrum has a range of low frequency, which is below a maximal frequency (302) dependent on a crankshaft frequency of an internal combustion engine producing the exhaust gas (4), and the fill level is ascertained to be higher the higher an integrated power density of the pressure frequency spectrum is in the range of low frequency, and
   carrying out an active filter regeneration when the fill level exceeds a predefined threshold value.

6. A non-transitory, computer-readable storage medium containing instructions that when executed by a computer cause the computer to ascertain a fill level of soot particles in a soot particulate filter (1), by:
   acquiring (510) a time course of a pressure of an exhaust gas (4) upstream (16) of the soot particulate filter (1) and/or a differential pressure over the soot particulate filter (1) as a pressure signal,
   transforming (520) the pressure signal into a pressure frequency spectrum,
   ascertaining (530) a spectral power density in the pressure frequency spectrum, and
   ascertaining (540) the fill level of the soot particles in the soot particulate filter (1) as a function of the spectral power density, wherein the pressure frequency spectrum has a range of low frequency, which is below a maximal frequency (302) dependent on a crankshaft frequency of an internal combustion engine producing the exhaust gas (4), and the fill level is ascertained to be higher the higher an integrated power density of the pressure frequency spectrum is in the range of low frequency, and
   carrying out an active filter regeneration when the fill level exceeds a predefined threshold value.

* * * * *